(12) United States Patent
Kuo et al.

(10) Patent No.: US 7,472,402 B2
(45) Date of Patent: Dec. 30, 2008

(54) DISK DRIVE HAVING DISK-POSITIONING MEMBERS TO FACILITATE ROTATION OF AN OPTICAL DISK AT THE READING AND/OR WRITING POSITION

(75) Inventors: Tsung-Jung Kuo, Hsinchu (TW); Jui-Chiang Lin, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 314 days.

(21) Appl. No.: 11/007,203

(22) Filed: Dec. 9, 2004

(65) Prior Publication Data

US 2005/0132389 A1 Jun. 16, 2005

(30) Foreign Application Priority Data

Dec. 12, 2003 (TW) .............................. 92135169 A

(51) Int. Cl.
*G11B 17/04* (2006.01)
(52) U.S. Cl. ..................................................... 720/622
(58) Field of Classification Search ................. 720/622, 720/634, 695, 704
See application file for complete search history.

(56) References Cited

U.S. PATENT DOCUMENTS 5,963,527 A * 10/1999 Hiraga ........................ 720/656

| | | | |
|---|---|---|---|
| 6,529,462 B1* | 3/2003 | Kurozuka et al. | 720/641 |
| 6,560,184 B2* | 5/2003 | Shida et al. | 720/603 |
| 7,107,598 B2* | 9/2006 | Ito | 720/623 |
| 7,313,800 B2* | 12/2007 | Inatani et al. | 720/704 |
| 2004/0133900 A1* | 7/2004 | Cho et al. | 720/603 |
| 2004/0139453 A1* | 7/2004 | Nakamura et al. | 720/603 |

FOREIGN PATENT DOCUMENTS

JP 2002298488 A * 10/2002

* cited by examiner

*Primary Examiner*—Andrea L Wellington
*Assistant Examiner*—Matthew G Kayrish
(74) *Attorney, Agent, or Firm*—Ming Chow; Sinorica, LLC

(57) ABSTRACT

A disk drive includes a chassis and first and second disk-positioning members mounted respectively on two opposite sides of the chassis. The first and second disk-positioning members have two straight inner portions extending perpendicularly and respectively from the opposite sides of the chassis to define a first distance therebetween, and two outer portions extending inclinedly and respectively from the inner straight portions in such a manner to define a second distance therebetween. The second distance is longer than the first distance. When an optical disk is moved to a reading and/or writing position from a temporary position, the inclined outer portions of the first and second disk-positioning members are spaced apart from the disk to permit smooth rotation thereof.

12 Claims, 18 Drawing Sheets

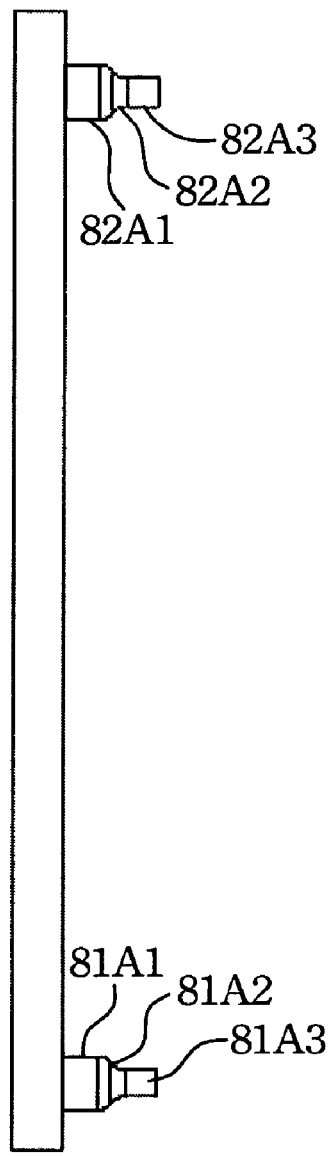
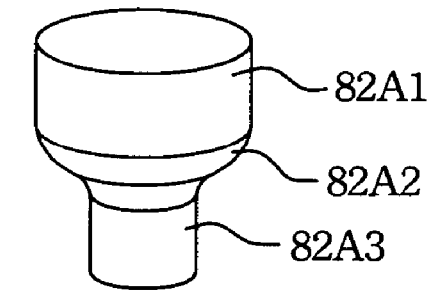
Fig.17B
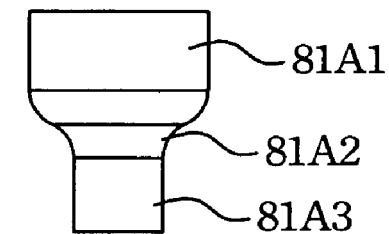
Fig.17A
Fig.17

US 7,472,402 B2

DISK DRIVE HAVING DISK-POSITIONING MEMBERS TO FACILITATE ROTATION OF AN OPTICAL DISK AT THE READING AND/OR WRITING POSITION

FIELD OF THE INVENTION

The invention relates to a disk drive, more particularly to a disk drive of slot-in type having disk-positioning members with a specific structure so as to permit smooth rotation of an optical disk when the disk is disposed at the reading and/or writing position.

BACKGROUND OF THE INVENTION

Among all the data storage solutions, the optical disks are becoming more and more important for backing up data and exchanging information because the optical storage disks have many advantages including a high storage capacity, easy to handle, and a long preserving time for the stored data. The optical disk drive also becomes more popular for this reason, and there are many types of the optical disk drive being provided for different users such as H/H type, slim type, slot-in type, and so on. Till now, the optical disk drive of slot-in type can be found all around such as notebook or laptop computers, DVD players, and even some instruments or electronic products with built-in microprocessors.

A conventional disk drive of slot-in type generally includes a casing having a front wall formed with a disk entrance-and-exit slot, and a disk transport mechanism disposed in the casing adjacent to the entrance-and-exit slot. Referring to FIGS. 1 to 4, the disk transport mechanism 8 generally includes a transport roller (not shown) disposed movably in the casing (not visible), a stationary chassis 1 disposed within the casing and aligned with the entrance-and-exit slot (not visible), a pair of front disk-guiding members (not visible) disposed adjacent to the entrance-and-exit slot, a pair of rear disk-guiding members disposed distal from the entrance-and-exit slot, a pair of disk-positioning members 81, 82 mounted on two opposite sides of the chassis 1 and disposed between the front and rear disk-guiding members, as shown in FIG. 5.

Upon detecting presence of an optical disk near the entrance-and-exit slot in the casing, the transport roller is actuated to rotate in a first direction in such a manner to draw the optical disk inward via the entrance-and-exit slot against biasing action of the front and rear disk-guiding members. The periphery of the optical disk will abut and push the front and rear disk-guiding members and to a temporary position within the casing. The disk 9 is retained temporarily at the temporary position (see FIG. 4) and is later conveyed to a reading and/or writing position, where the disk 9 is disposed securely onto a rotating seat 2 with the assistance of a clamp 4 (see FIG. 6).

One disadvantage of the aforesaid conventional disk drive is that the casing is not always allowed to be kept in the horizontal position (i.e. the entrance-and-exit slot in the casing extends in a horizontal direction), but sometimes the casing is required to be kept in the vertical position (i.e. the entrance-and-exit slot in the casing extends in a vertical direction) due to some reasons, such as due to limited space in an automobile. Under this condition, when the disk 9 is retained temporarily at the temporary position, the periphery of the disk 9 contacts the lower disk-positioning member 81 by virtue of its gravity weight so that the disk 9 is not coaxial with the rotating seat (sees FIG. 4 and 5). In order to position the disk 9 to be coaxial with the rotating seat, the distance between the disk-positioning members 81, 82 is closed to the diameter of the disk 9 (sees FIG. 6). Since the disk 9 is not required to be rotated at the temporarily position, no problems arise. However, the disk-positioning members 81, 82 hinder smooth rotation of the disk 9 at the reading and/or writing position.

SUMMARY OF THE INVENTION

The object of the present invention is to provide a disk drive of slot-in type having disk-positioning members with a specific structure so as to permit smooth rotation of an optical disk when the disk is disposed at the reading and/or writing position.

A disk drive according to the present invention includes: a chassis having a through hole; a rotating seat disposed below the chassis and adapted to hold and co-rotate with an optical disk when the latter is moved onto the rotating seat; a clamper disposed above the chassis and capable of passing through the through hole in the chassis toward the rotating seat for cooperatively holding the optical disk so as to dispose the disk in a reading and/or writing position; and first and second disk-positioning members mounted respectively on two opposite sides of the chassis for retaining the disk at a temporary position adjacent to the reading and/or writing position prior to the disk being carried onto the rotating seat. The first and second disk-positioning members have two straight inner portions extending perpendicularly and respectively from the opposite sides of the chassis to define a first distance therebetween, and two outer portions extending inclinedly and respectively from the inner straight portions in such a manner to define a second distance therebetween that is greater than the first distance. The straight inner portions of the first and second disk-positioning members restrict the disk to be coaxial with the rotating seat. The inclined outer portions of the first and second disk-positioning members are spaced apart from the disk to permit smooth rotation thereof when the disk is moved to the reading and/or writing position.

BRIEF DESCRIPTION OF THE DRAWINGS

Other features and advantages of this invention will become more apparent in the following detailed description of the preferred embodiments of this invention, with reference to the accompanying drawings, in which:

FIG. 11A is an enlarged view of the first disk-positioning member mounted on the chassis of the first embodiment of the disk drive according to the present invention;

FIG. 11B is an enlarged view of the second disk-positioning member mounted on the chassis of the first embodiment of the disk drive according to the present invention;

FIG. 15A is an enlarged view of the first disk-positioning member mounted on the chassis of the second embodiment of the disk drive according to the present invention;

FIG. 15B is an enlarged view of the second disk-positioning member mounted on the chassis of the second embodiment of the disk drive according to the present invention;

FIG. 17 is a vertical view of the third embodiment of the disk drive according to the present invention;

FIGS. 17A and 17B respectively show first and second disk-positioning members employed in the third embodiment of the disk drive according to the present invention.

DETAILED DESCRIPTIONS OF THE PREFERRED EMBODIMENTS

Figure 1:
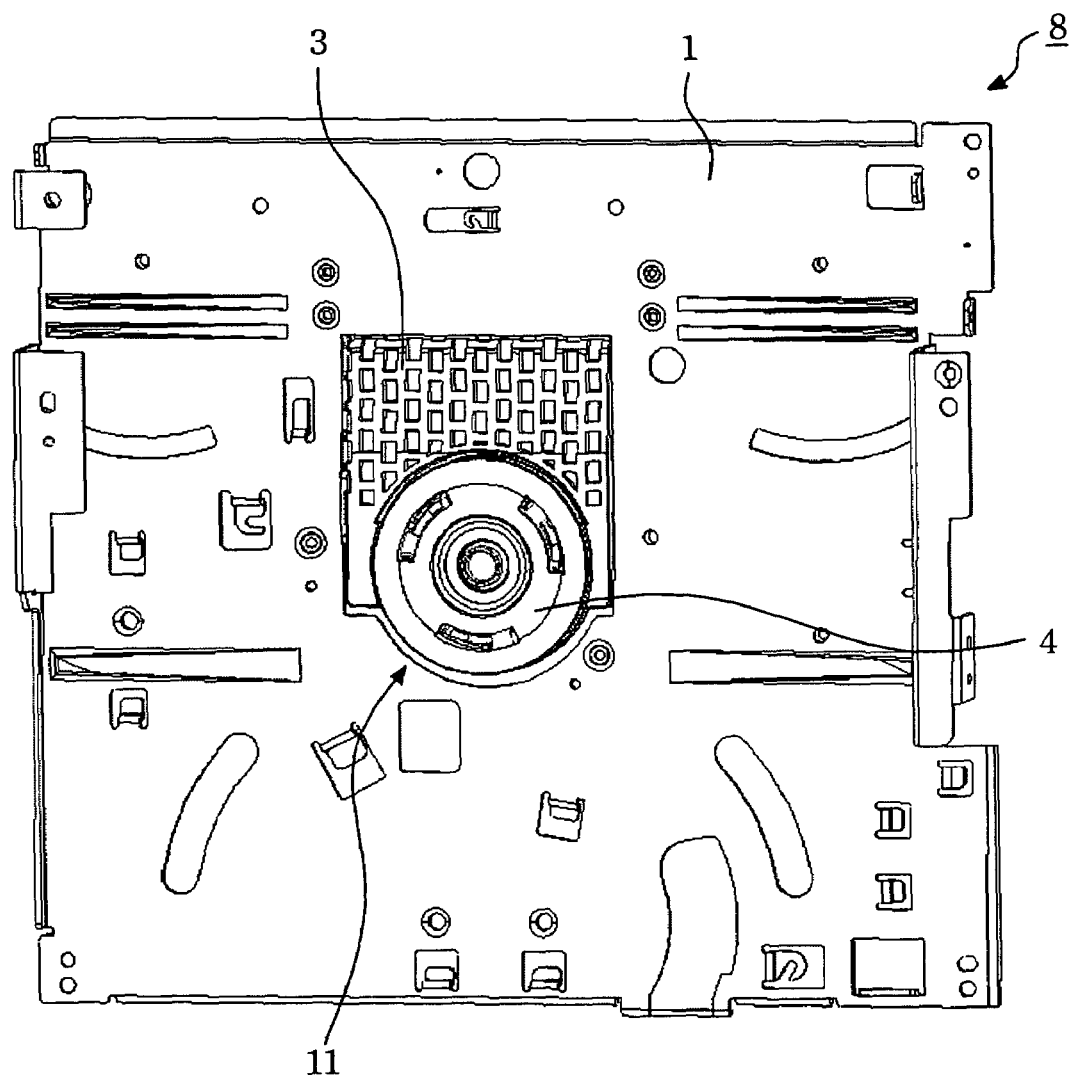
FIG. 1 shows a bottom view of a chassis in a conventional disk drive of slot-in type with an outer casing removed.
Figure 2:
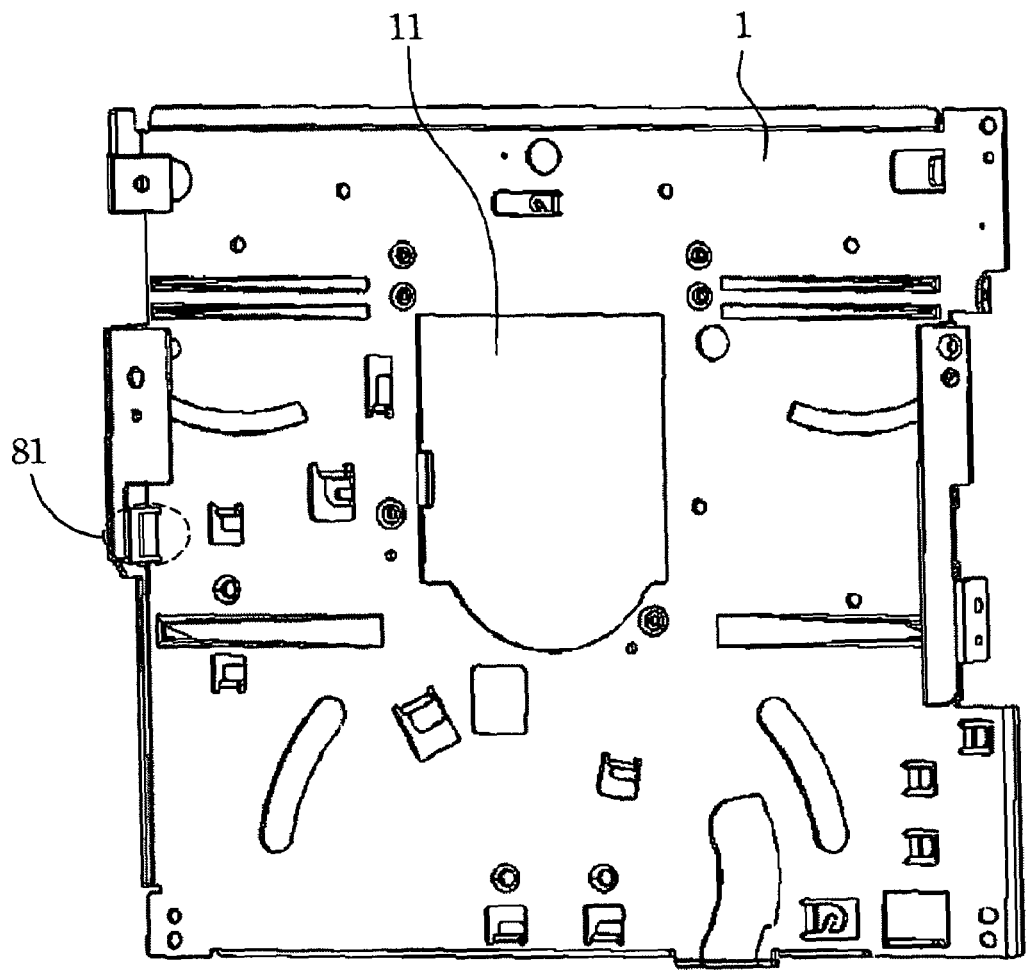
FIG. 2 is a bottom view of the chassis in the conventional disk drive with the outer casing removed, illustrating how a first disk-positioning member is mounted on the chassis.
Figure 3:
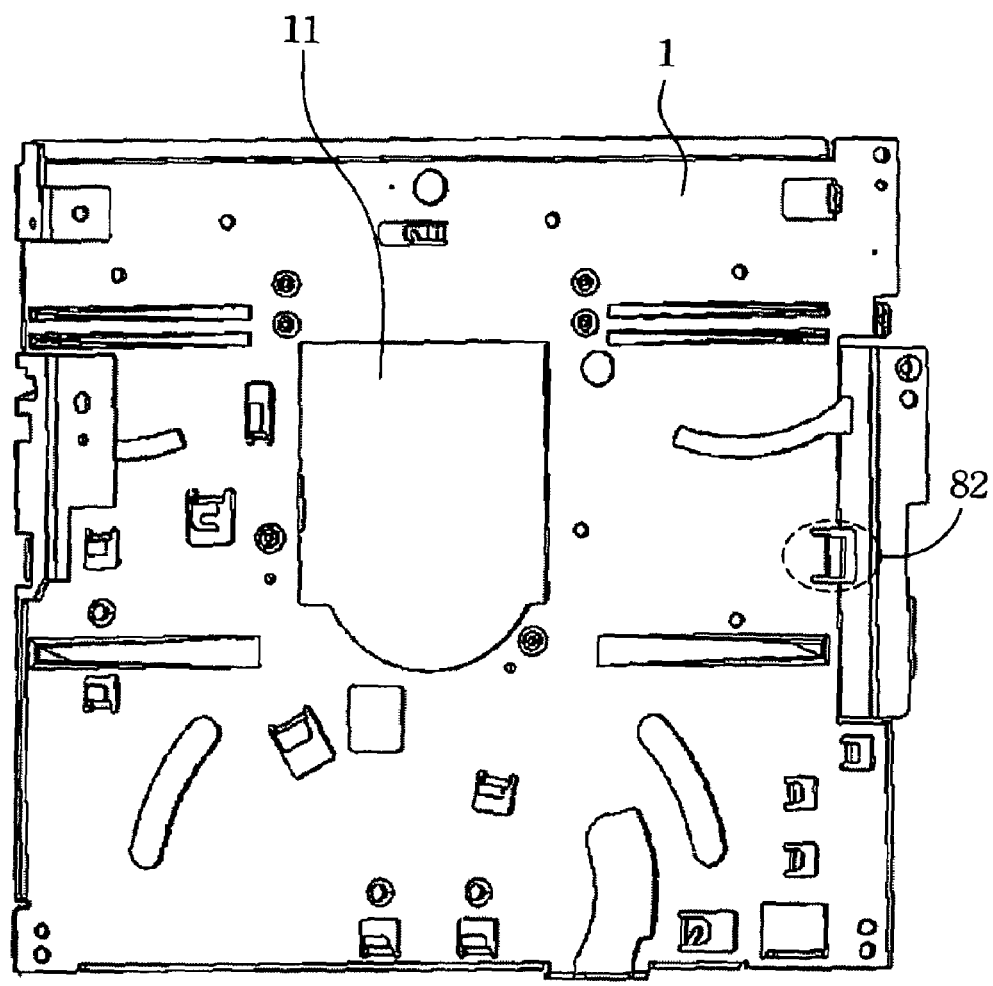
FIG. 3 is a bottom view of the chassis in the conventional disk drive with the outer casing removed, illustrating how a second disk-positioning member is mounted on the chassis.
Figure 4:
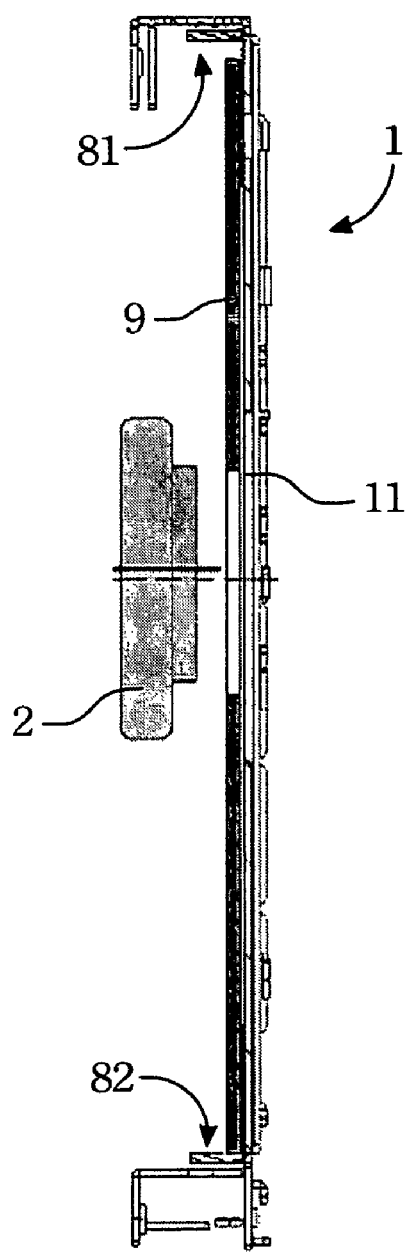
FIG. 4 is a vertical view of the conventional disk drive with the outer casing removed, illustrating relationship between the chassis and a rotating seat when an optical disk is disposed at a temporary position.
Figure 5:
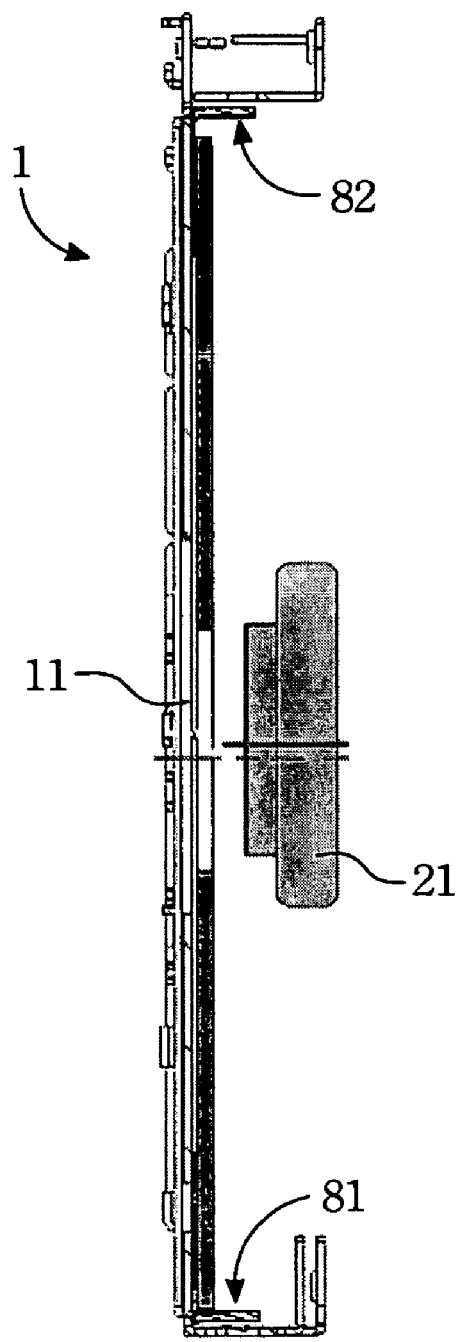
FIG. 5 is another vertical view of the conventional disk drive with the outer casing removed, illustrating relationship between the chassis and the rotating seat when the optical disk is disposed at the temporary position.
Figure 6:
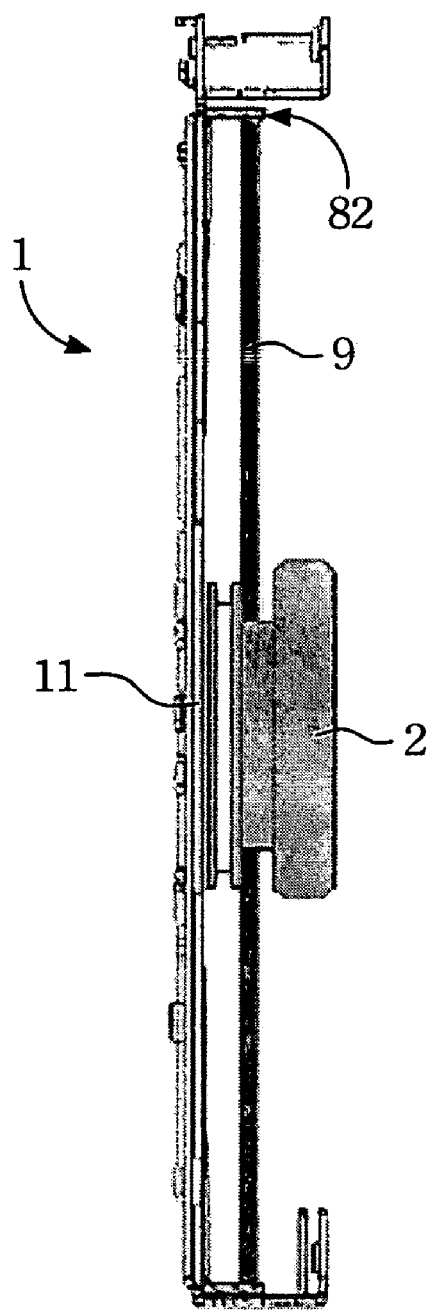
FIG. 6 is a partly vertical view of the conventional disk drive with the outer casing removed, illustrating relationship between the chassis and the rotating seat when the optical disk is disposed at a reading and/or writing position.
Figure 7:
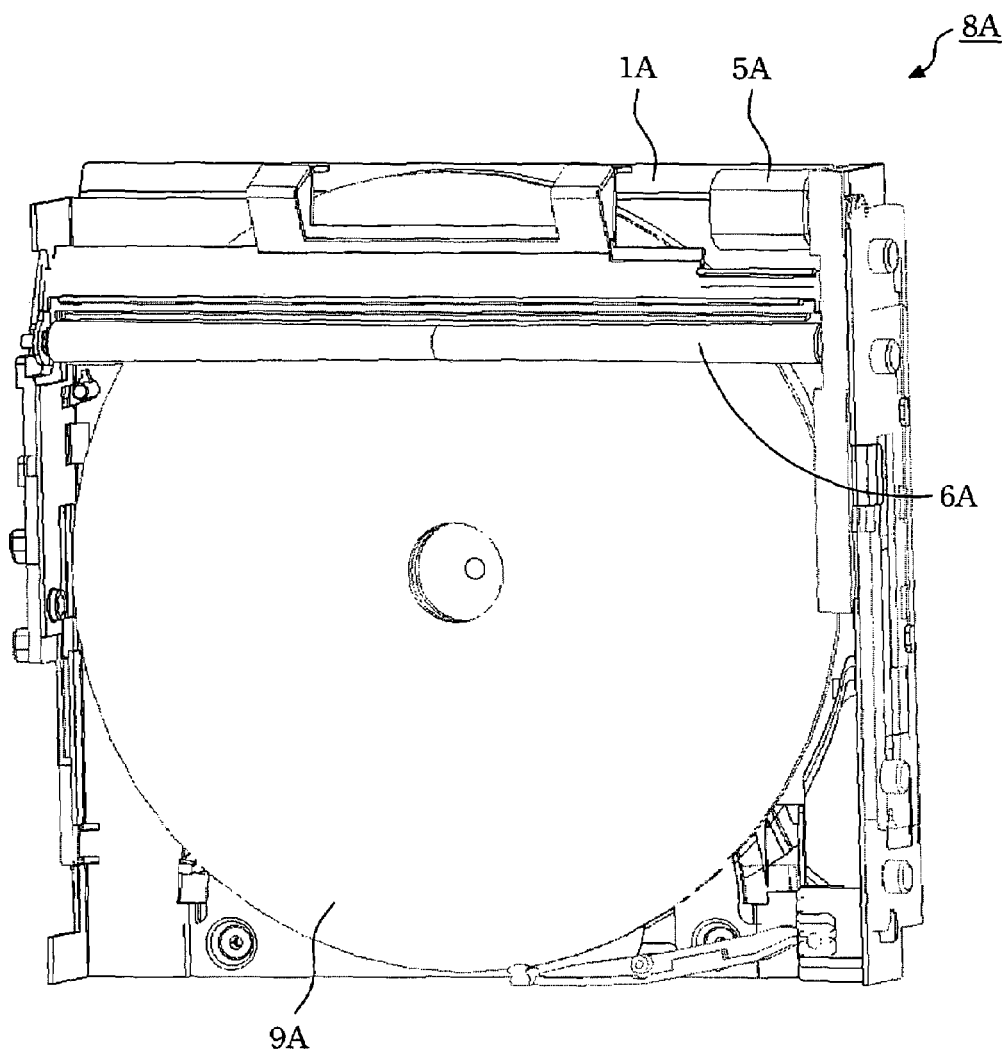
FIG. 7 is a bottom view of a first embodiment of the disk drive according to the present invention with the outer casing removed, illustrating how an optical disk is retained at a temporary position on a chassis prior to moving to a reading and/or writing position.
Figure 8:
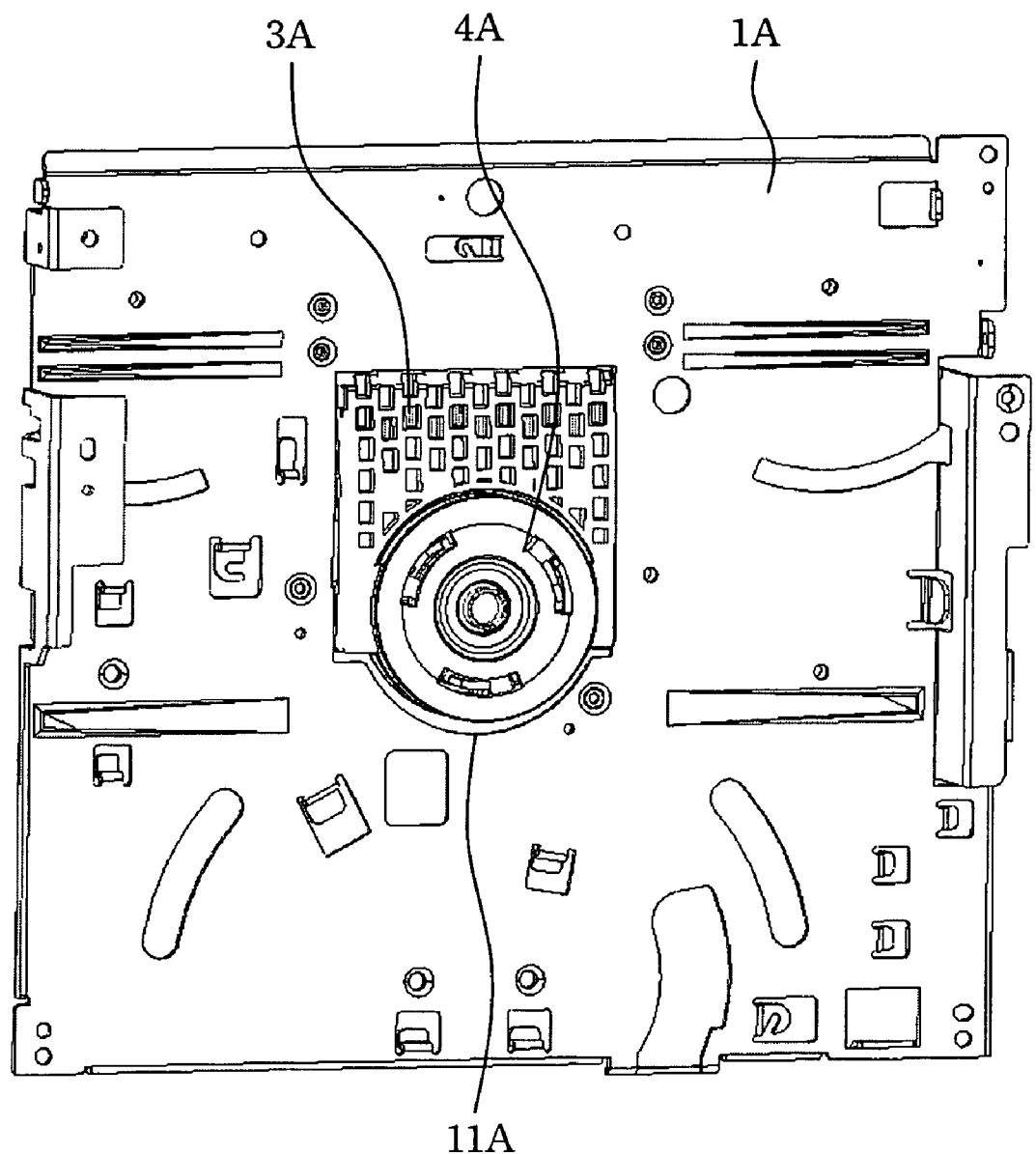
FIG. 8 is a is a bottom view of the chassis in the first embodiment of the disk drive according to the present invention with the outer casing removed.
Figure 9:
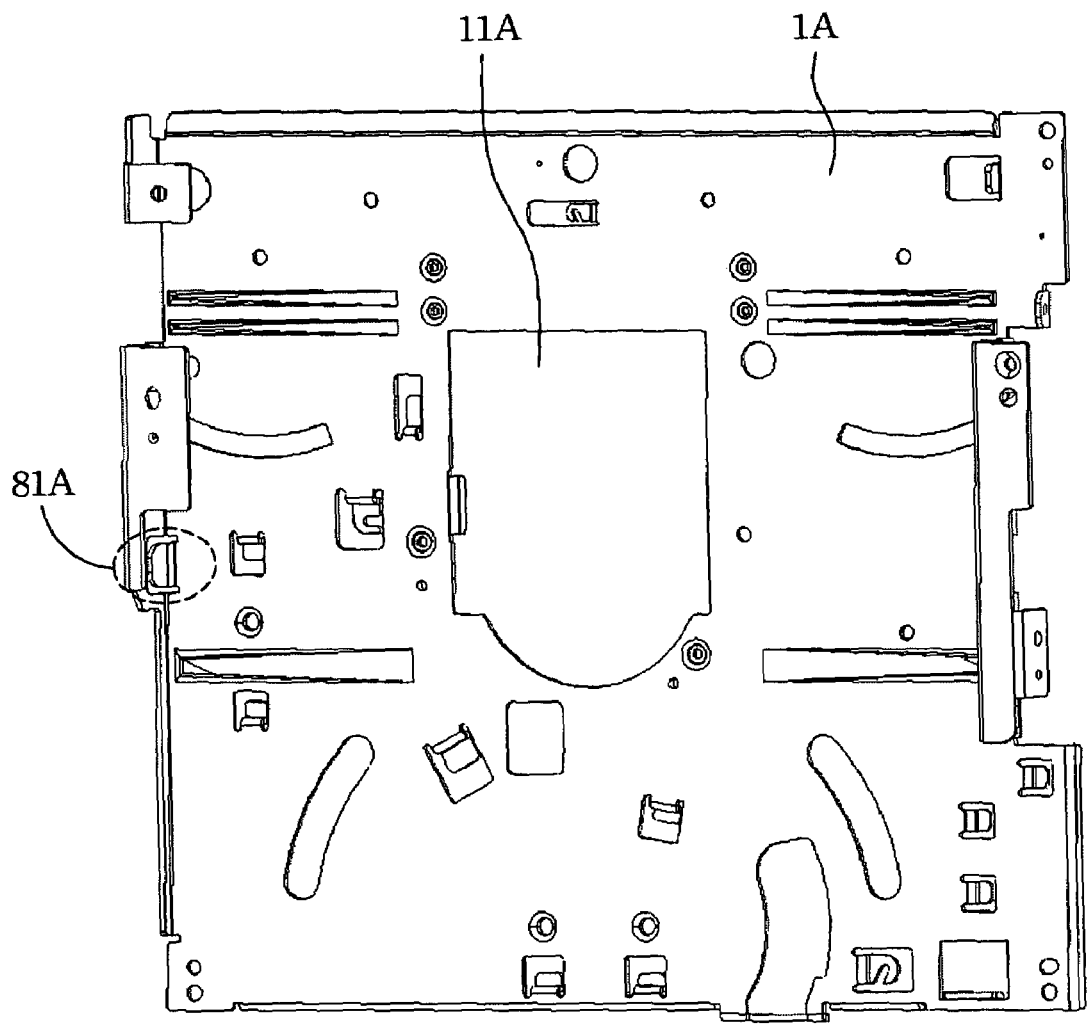
FIG. 9 is a bottom view of the chassis in the first embodiment of the disk drive according to the present invention with the outer casing removed, illustrating how a first disk-positioning member is mounted on the chassis.

FIGS. 7 to 9 respectively show bottom views of a disk drive of slot-in type with an outer casing removed therefrom. The disk drive is generally installed in desktop computers, laptop computers, DVD players, or in an audio-and-video instrument for reproducing the information recorded in an optical disk, such as playing songs from a CD.

Figure 10:
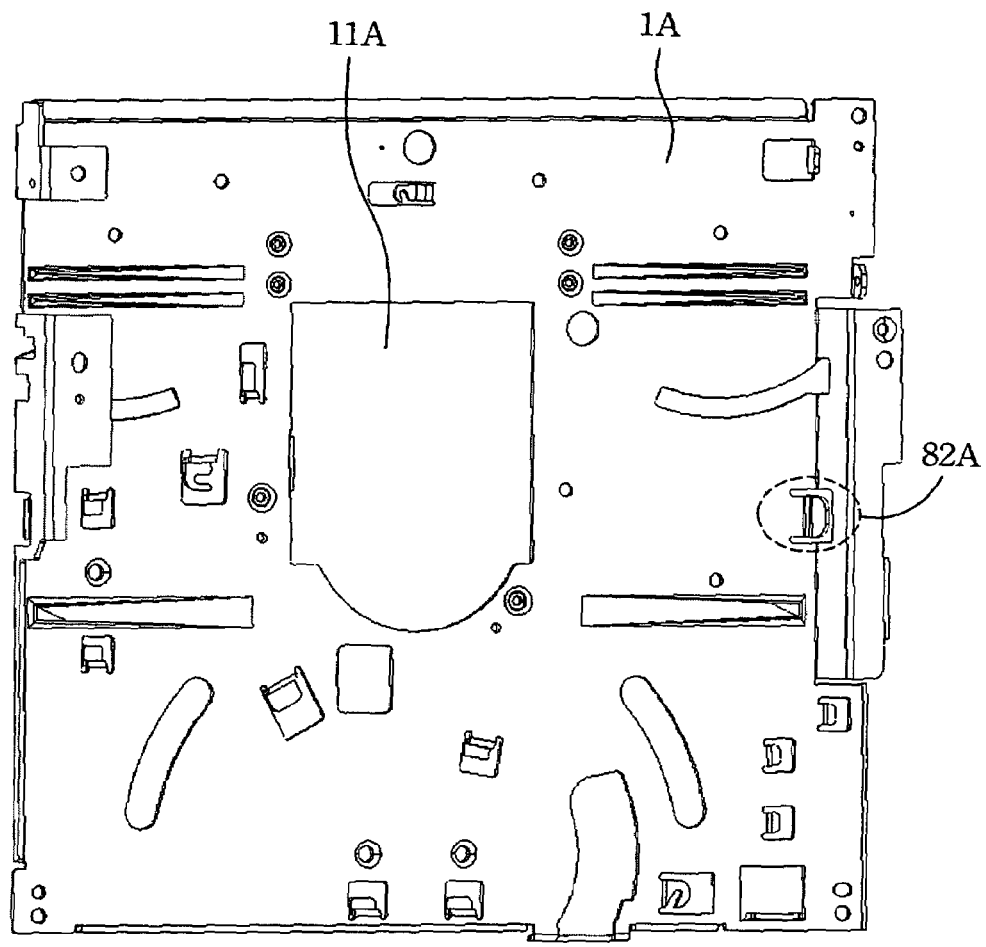
FIG. 10 a bottom view of the chassis in the first embodiment of the disk drive of the present invention with the outer casing removed, illustrating how a second disk-positioning member is mounted on the chassis.

The disk drive includes a casing (not visible since removed) having a front wall formed with a disk entrance-and-exit slot, and a disk transport mechanism 8A disposed in the casing adjacent to the entrance-and-exit slot. Referring to FIGS. 7, the disk transport mechanism 8A generally includes a transport roller 6A disposed movably in the casing (not visible), a stationary chassis 1A disposed within the casing and aligned with the entrance-and-exit slot and formed with a through hole 11A, a pair of front disk-guiding members (not visible) disposed adjacent to the entrance-and-exit slot, a pair of rear disk-guiding members (not visible) disposed distal from the entrance-and-exit slot, a pair of disk-positioning members 81A, 82A (sees FIGS. 9, 10). The pair of disk-positioning members 81A, 82A is integrally formed with the chassis 1A or is screwed securely on two opposite sides of the chassis 1A, and is disposed between the front and rear disk-guiding members. Since operations of the transport roller for drawing the disk 9A into the retaining position (see FIGS. 11 and 12) with the assistance of the front and rear disk-guiding members, and conveying of the disk from the retaining position to the reading and/or writing position (see FIGS. 13 and 14) with the assistance of the clamper 4A are not the relevant feature of the present invention, a detailed disclosure thereof is omitted herein for the sake of brevity.

Figure 11:
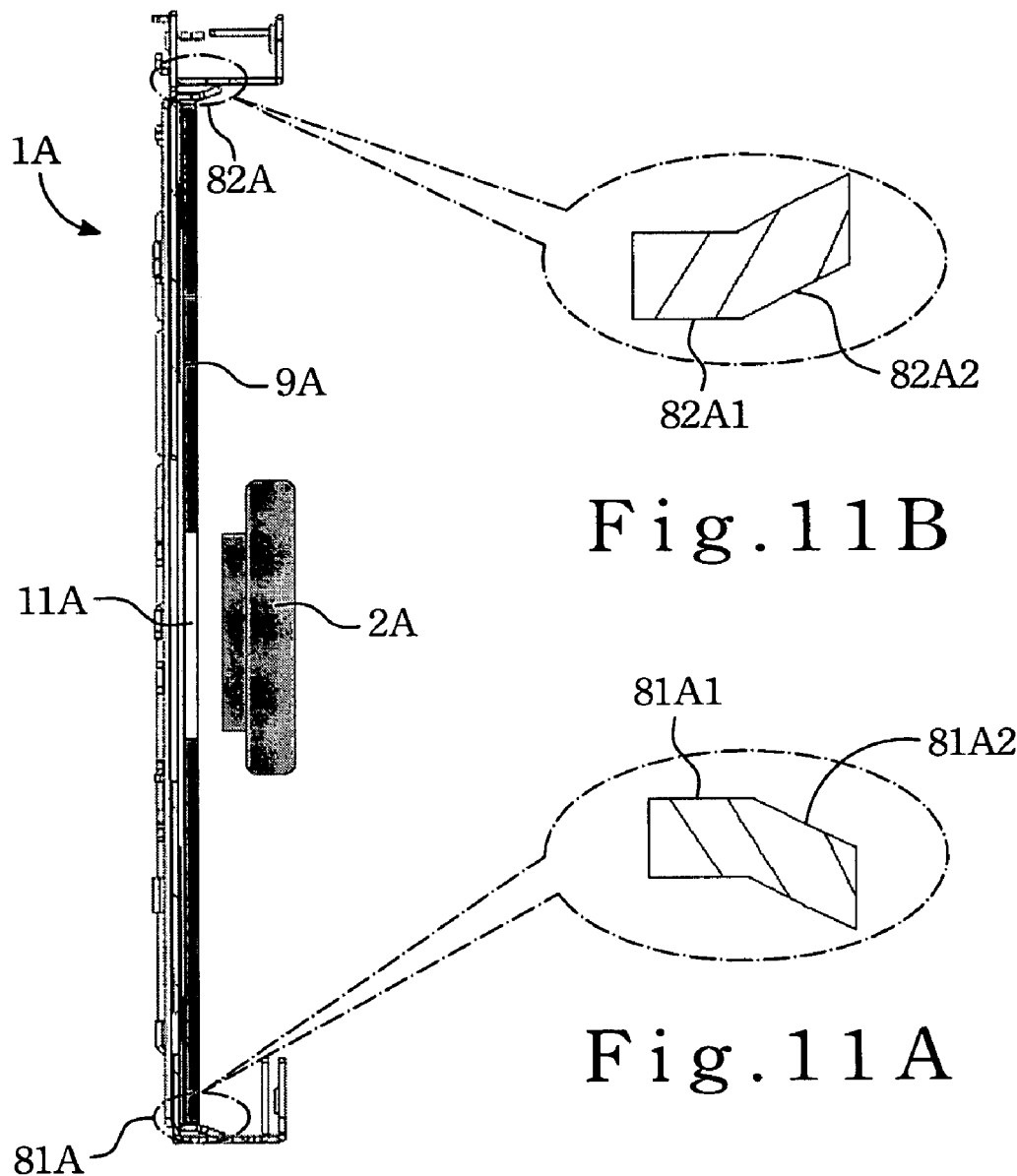
FIG. 11 is a vertical view of the first embodiment of the disk drive according to the present invention with the outer casing removed, illustrating relationship between the chassis and a rotating seat when an optical disk is disposed at a temporary position.
Figure 12:
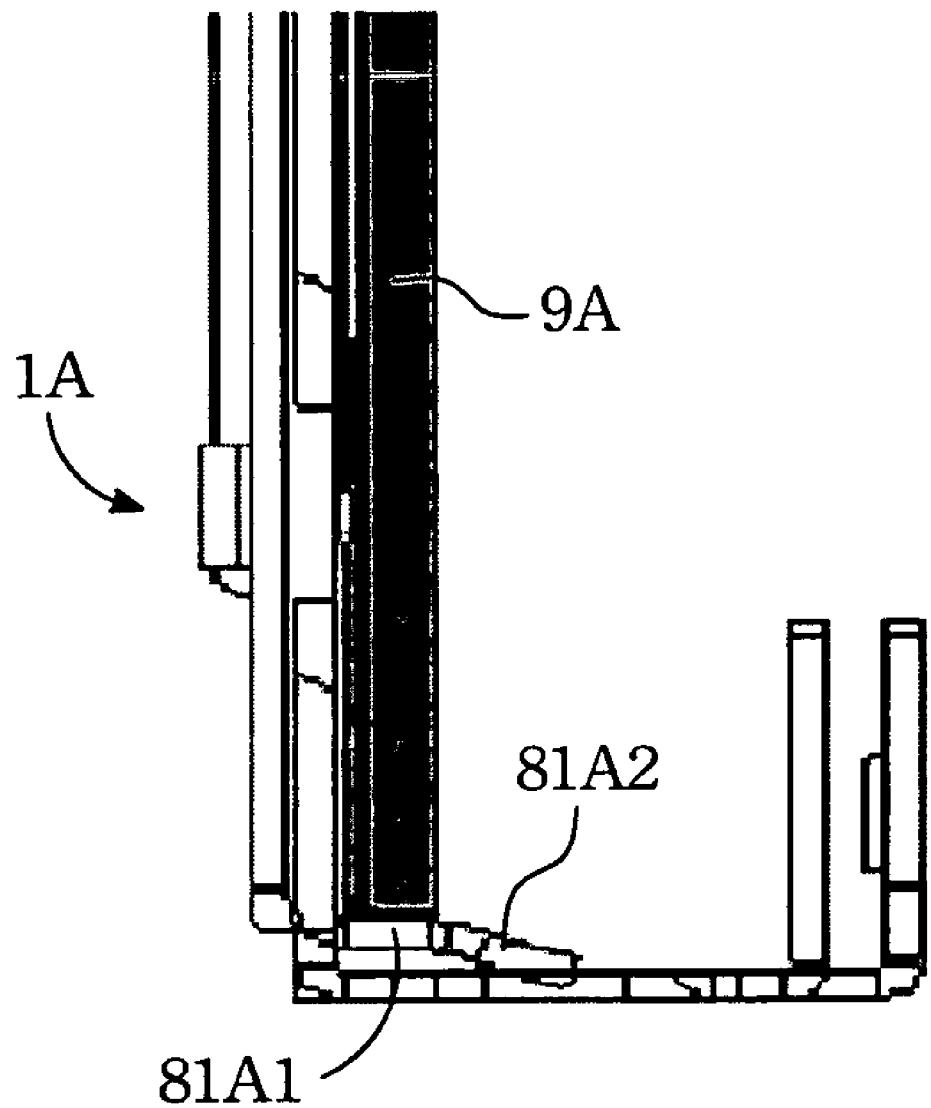
FIG. 12 is a partly vertical view of the first embodiment of the disk drive according to the present invention when the disk is disposed at the temporary position.
Figure 13:
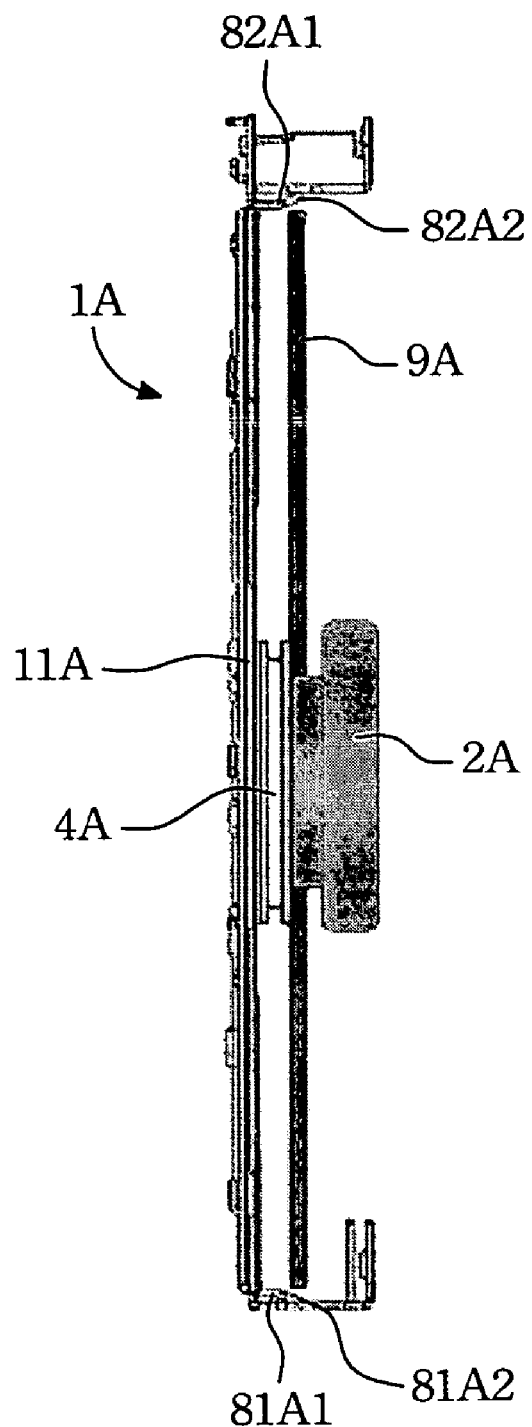
FIG. 13 is a vertical view of the first embodiment of the disk drive according to the present invention when the disk is disposed at the reading and/or writing position.
Figure 14:
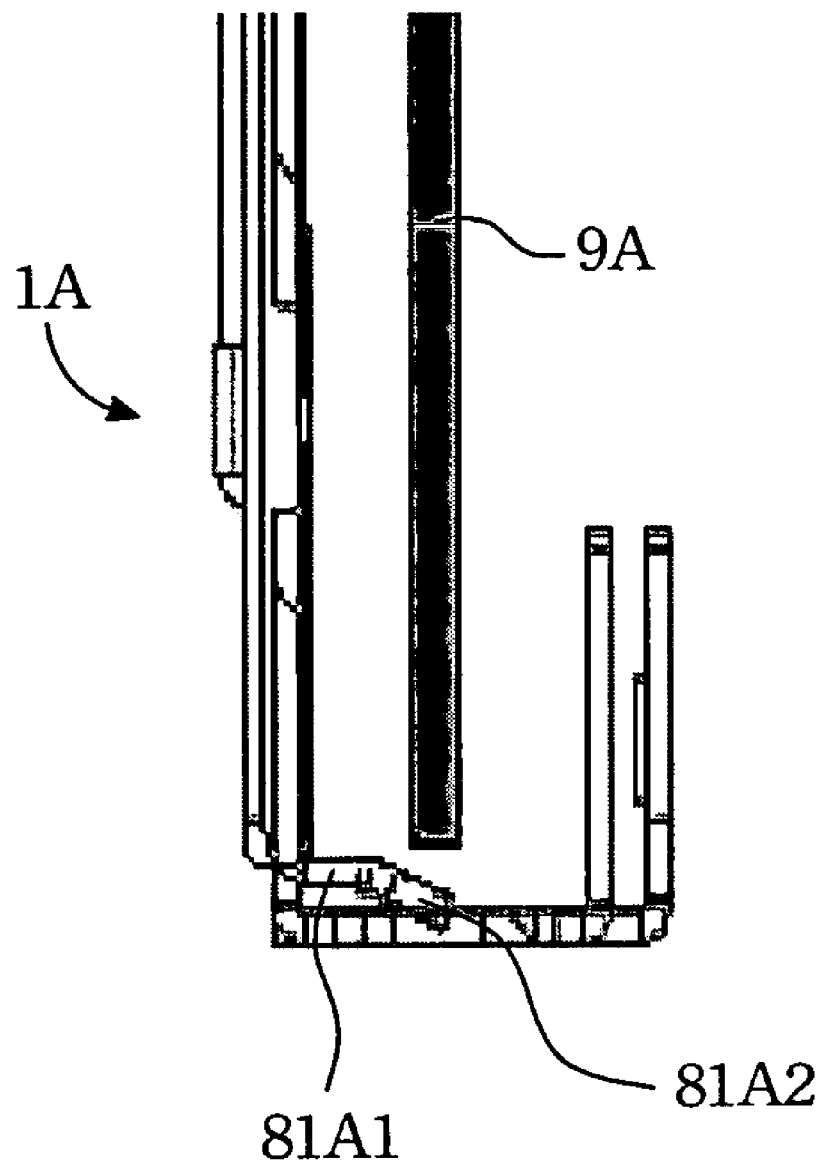
FIG. 14 is a partly vertical view of the first embodiment of the disk drive according to the present invention when the disk is disposed( at the reading and/or writing position.
Figure 15:
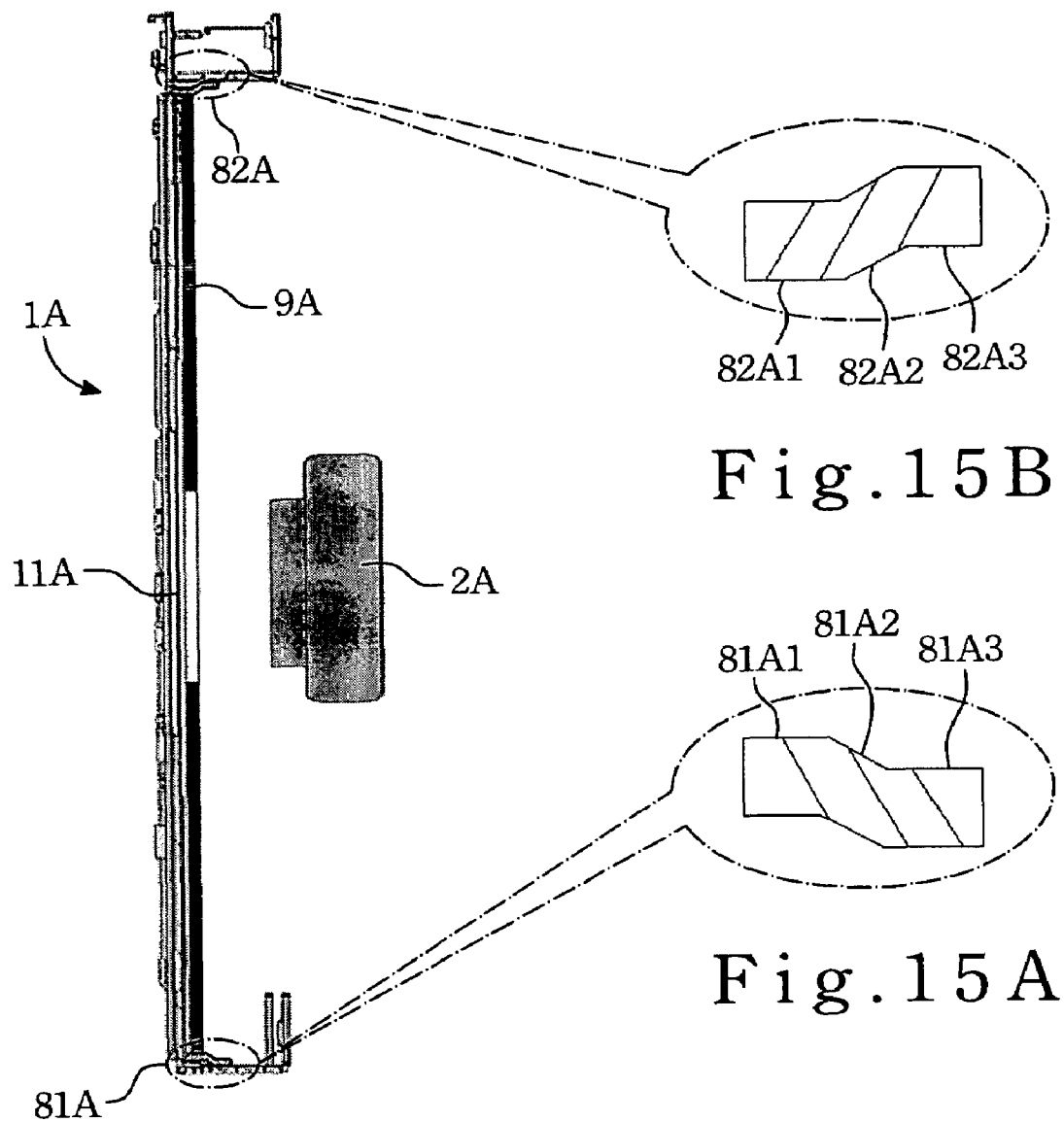
FIG. 15 is a vertical view of the second embodiment of the disk drive according to the present invention with the outer casing removed, illustrating relationship between the chassis and the rotating seat when the optical disk is disposed at a temporary position.
Figure 16:
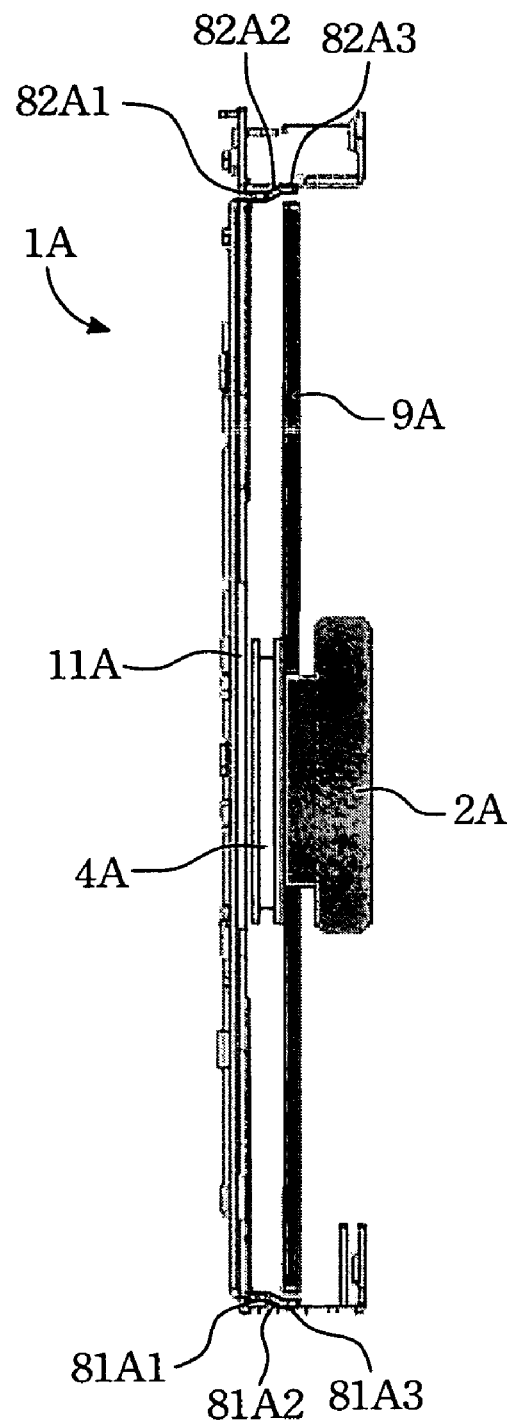
FIG. 16 is a vertical view of the second embodiment of the disk drive according to the present invention when the disk is disposed at the reading and/or writing position.

Referring to FIGS. 11, 11A and 11B, in a first embodiment of the disk drive of the present invention, the first and second disk-positioning members 81A, 82A have two straight inner portions 81A1, 82A1 extending perpendicularly and respectively from the opposite sides of the chassis 1A to defining a first distance therebetween, and two outer portions 81A2, 82A2 extending inclinedly and respectively from the inner straight portions 81A1, 82A1 in such a manner to define a second distance which is the average distance between the outer portions 81A2, 82A2. The first distance is closed to the diameter of the disk and the second distance is greater than the first distance. With the unique structure, even though the casing is disposed in the vertical position, as shown in FIGS. 11 to 14, when the disk 9A is retained at the temporary position, the straight inner portions 81A1, 82A1 of the first and second disk-positioning members 81A, 82A restrict the disk 9A to be coaxial with the rotating seat, and when the disk 9A is clamped by the clamper 4A and the rotating seat 2A so as to dispose the disk 9A at the reading and/or writing position, the inclined outer portions 81A2, 82A2 of the first and second disk-positioning members 81A, 82A are spaced apart from the disk 9A to permit smooth rotation thereof.

Referring to FIGS. 15, 15A, 15B and 16, in a second embodiment of the disk drive of the present invention, the first and second disk-positioning members 81A, 82A further have two extension portions 81A3, 82A3 extending respectively from the inclined outer portions 81A2, 82A2 to define a third distance therebetween. The third distance is longer than the second distance defined by the inclined outer portions 81A2, 82A2 of the first and second disk-positioning members 81A, 82A.

Referring to FIGS. 17, 17A and 17B, in a third embodiment of the disk drive of the present invention, the first and second disk-positioning members 81A, 82A are cylindrical-shaped, and have two large-diameter sections respectively defining the straight inner portions 81A1, 82A1 and extend integrally from the opposite sides of the chassis 1A, two small-diameter sections respectively defining the extension portions 81A3, 82A3, and two constricted sections between the large-diameter and-small-diameter sections and respectively defining the inclined outer portions 81A2, 82A2.

Figure 18:
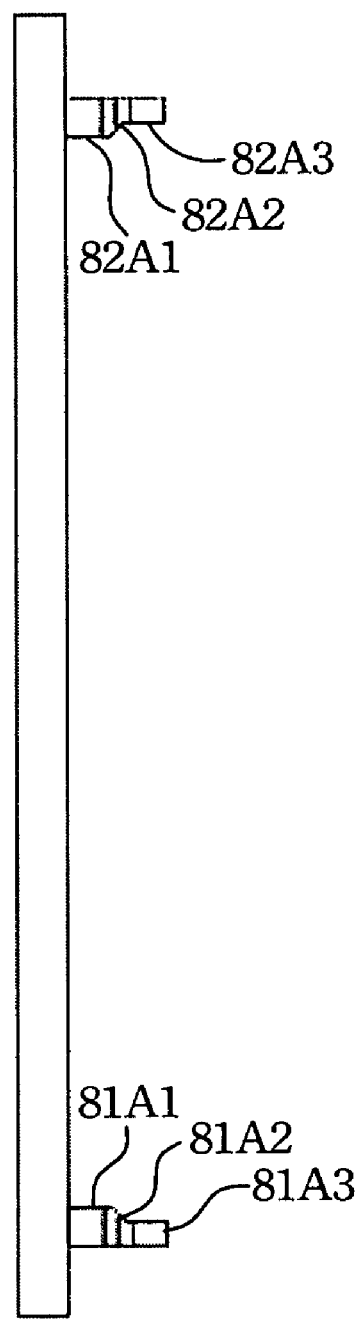
FIG. 18 is a vertical view of the fourth embodiment of the disk drive according to the present invention.

Referring to FIG. 18, in a fourth embodiment of the disk drive of the present invention, the first and second disk-positioning members 81A, 82A have two large uniform sections respectively defining the straight inner portions 81A1, 82A1, two small uniform sections respectively defining the extension portions 81A3, 82A3, and two constricted sections between the large uniform and small uniform sections and respectively defining the inclined outer portions 81A2, 82A2.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A disk drive comprising:
    a chassis having a through hole;
    a rotating seat disposed below said chassis and adapted to hold and co-rotate with an optical disk;
    a clamper disposed above said chassis and capable of passing through said through hole in said chassis toward said rotating seat for cooperatively holding the optical disk; and
    first and second disk-positioning members mounted respectively on two opposite sides of said chassis,
    said first and second disk-positioning members having two straight inner portions extending perpendicularly and respectively from said opposite sides of said chassis and defining a first distance therebetween, two outer portions extending inclinedly and respectively from said inner straight portions in such a manner to define a second distance therebetween that is greater than said first distance, and two extension portions extending respectively from said inclined outer portions;
    wherein, said optical disk is positioned at a temporary position before being clamped by said clamper and is positioned at a reading and/or writing position after being clamped by said clamper;
    wherein, circumference of said optical disk faces said straight inner portions and is restricted by said straight inner portions when said optical disk is at said temporary position;
    wherein, circumference of said optical disk faces said inclined outer portions and is spaced apart from said inclined outer portions when said optical disk is at said reading and/or writing position;
    wherein, said first and second disk-positioning members are cylindrical-shaped, and have two large-diameter sections respectively defining said straight inner portions, two small-diameter sections respectively defining said extension portions, and two constricted sections between said large-diameter and-small-diameter sections and respectively defining said inclined outer portions.

2. The disk drive according to claim 1, wherein said extension portions defines a third distance that is greater than said second distance defined by said inclined outer portions.

3. The disk drive according to claim 1, wherein said first and second disk-positioning members extend integrally from said opposite sides of said chassis.

4. The disk drive according to claim 1, wherein said first and second disk-positioning members have two large uniform sections respectively defining said straight inner portions, two small uniform sections respectively defining said extension portions, and two constricted sections between said large uniform and small uniform sections and respectively defining said inclined outer portions.

5. The disk drive according to claim 1, wherein said first and second disk-positioning members are mounted securely on said opposite sides of said chassis.

6. The disk drive according to claim 1, wherein said first and second disk-positioning members are screwed securely on said opposite sides of said chassis.

7. A disk drive including a chassis having a through hole, a rotating seat disposed below the chassis in alignment with the through hole and capable of holding and co-rotating with an optical disk, a clamper disposed above the chassis and capable of passing through the through hole in the chassis toward the rotating seat for cooperatively holding the optical disk, and first and second disk-positioning members mounted respectively on two opposite sides of said chassis, the first and second disk-positioning members comprising:
    two straight inner portions extending perpendicularly and respectively from the opposite sides of the chassis and defining a first distance therebetween;
    two outer portions extending inclinedly and respectively from said inner straight portions in such a manner to define a second distance therebetween that is greater than said first distance; and
    two extension portions extending respectively from said inclined outer portions;
    wherein, said optical disk is positioned at a temporary position before being clamped by said clamper and is positioned at a reading and/or writing position after being clamped by said clamper;
    wherein, circumference of said optical disk faces said straight inner portions and is restricted by said straight inner portions when said optical disk is at said temporary position;
    wherein, circumference of said optical disk faces said inclined outer portions and is spaced apart from said inclined outer portions when said optical disk is at said reading and/or writing position;
    wherein, said first and second disk-positioning members are cylindrical-shaped, and have two large-diameter sections respectively defining said straight inner portions, two small-diameter sections respectively defining said extension portions, and two constricted sections between said large-diameter and-small-diameter sections and respectively defining said inclined outer portions.

8. The disk drive according to claim 7, wherein said extension portions defines a third distance that is greater than said second distance defined by said inclined outer portions.

9. The disk drive according to claim 8, wherein the first and second disk-positioning members have two large uniform sections respectively defining said straight inner portions, two small uniform sections respectively defining said extension portions, and two constricted sections between said large uniform and small uniform sections and respectively defining said inclined outer portions.

10. The disk drive according to claim 7, wherein the first and second disk-positioning members extend integrally from the opposite sides of the chassis.

11. The disk drive according to claim 7, wherein the first and second disk-positioning members are mounted securely on the opposite sides of the chassis.

12. The disk drive according to claim 7, wherein the first and second disk-positioning members are screwed securely on the opposite sides of the chassis.

* * * * *